US010013277B2

(12) United States Patent
Little

(10) Patent No.: US 10,013,277 B2
(45) Date of Patent: Jul. 3, 2018

(54) ROLLING BACK STATE CHANGES IN DISTRIBUTED TRANSACTIONS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1442 days.

(21) Appl. No.: 12/475,434

(22) Filed: May 29, 2009

(65) Prior Publication Data

US 2010/0306181 A1 Dec. 2, 2010

(51) Int. Cl.
*G06F 9/46* (2006.01)
*G06F 11/14* (2006.01)

(52) U.S. Cl.
CPC .......... *G06F 9/466* (2013.01); *G06F 11/1474* (2013.01)

(58) Field of Classification Search
CPC .......... G06F 11/2094; G06F 17/30277; G06F 17/30578; G06F 9/541; G06F 11/1641; G06F 11/1412; G06F 11/1474; G06F 11/2023; G06F 11/2035; G06F 11/1433; G06F 11/1471; G06F 8/68; G06F 11/1417; G06F 17/30327; G06F 2209/501; G06F 9/466; G06F 9/5061; G06F 9/505; G06F 2209/509; G06F 9/50; G06F 11/3433; G06F 2201/81; G06F 2209/485; G06F 2209/504; G06F 9/5011; G06F 9/5088; G06F 17/30368; G06F 17/30575; Y10S 707/959; Y10S 707/99931; Y10S 707/99932; Y10S 707/99937; Y10S 707/99942; Y10S 707/99944; H04L 67/1095; H04L 67/1097

USPC .......... 714/16; 709/201, 220, 223, 224, 226, 709/229, 232; 717/170, 127, 3, 120, 168, 717/160; 707/684, E17.001, E17.005, 707/E17.012, 999.008, 999.202; 370/331, 370/468; 718/100, 104, 105, 107, 108
See application file for complete search history.

(56) References Cited

U.S. PATENT DOCUMENTS

| | | | | |
|---|---|---|---|---|
| 5,561,795 | A * | 10/1996 | Sarkar | G06F 11/1471 |
| 5,850,507 | A * | 12/1998 | Ngai et al. | 714/16 |
| 6,047,285 | A * | 4/2000 | Jacobs | G06F 17/30327 |
| | | | | 702/179 |
| 6,182,241 | B1 * | 1/2001 | Ngai et al. | 714/16 |
| 6,504,622 | B1 * | 1/2003 | Campbell et al. | 358/1.17 |
| 6,631,395 | B1 * | 10/2003 | Chessell | 718/101 |
| 6,647,510 | B1 * | 11/2003 | Ganesh et al. | 714/16 |
| 7,257,595 | B2 * | 8/2007 | Verma et al. | 707/683 |
| 7,430,740 | B1 * | 9/2008 | Molloy et al. | 718/101 |
| 8,161,018 | B2 * | 4/2012 | Walker | 707/704 |
| 8,675,877 | B2 * | 3/2014 | Schneider | 380/278 |
| 8,732,709 | B2 * | 5/2014 | Smith, Jr. | H04L 67/02 |
| | | | | 707/607 |
| 8,775,373 | B1 * | 7/2014 | Ross | H04L 67/1095 |
| | | | | 707/612 |
| 2002/0165724 | A1 * | 11/2002 | Blankesteijn | G06Q 30/06 |
| | | | | 705/1.1 |
| 2003/0177485 | A1 * | 9/2003 | Waldin et al. | 717/169 |
| 2003/0200212 | A1 * | 10/2003 | Benson et al. | 707/7 |

(Continued)

*Primary Examiner* — Oleg Survillo
(74) *Attorney, Agent, or Firm* — Lowenstein Sandler LLP

(57) ABSTRACT

During a distributed transaction, a computing device that hosts a participant of the distributed transaction intercepts an operation to change a resource from an initial state to a resultant state. The computing device determines an inverse operation that will change the resource from the resultant state back to the initial state. The computing device records the inverse operation and performs the operation.

11 Claims, 6 Drawing Sheets

(56) References Cited

U.S. PATENT DOCUMENTS

| | | | |
|---|---|---|---|
| 2003/0204534 A1* | 10/2003 | Hopeman | G06F 17/30595 |
| 2004/0068501 A1* | 4/2004 | McGoveran | 707/8 |
| 2004/0078379 A1* | 4/2004 | Hinshaw et al. | 707/100 |
| 2006/0123059 A1* | 6/2006 | Zamfiroiu | G06F 17/30289 |
| 2006/0149876 A1* | 7/2006 | Fecht | G06F 9/466 710/113 |
| 2006/0179438 A1* | 8/2006 | Jackson | G06F 9/4881 718/104 |
| 2007/0101192 A1* | 5/2007 | Kutan | G06F 11/1474 714/16 |
| 2007/0112885 A1* | 5/2007 | Farr | 707/202 |
| 2007/0174315 A1* | 7/2007 | Leff | G06F 17/30575 |
| 2008/0016508 A1* | 1/2008 | Goto | G06F 9/5088 718/102 |
| 2008/0256074 A1* | 10/2008 | Lev et al. | 707/8 |
| 2008/0288727 A1* | 11/2008 | Baum et al. | 711/149 |
| 2009/0138531 A1* | 5/2009 | Horii | 707/204 |
| 2009/0182782 A1* | 7/2009 | Karve et al. | 707/202 |
| 2009/0276449 A1* | 11/2009 | Syed | G06F 17/30442 |
| 2010/0191713 A1* | 7/2010 | Lomet | G06F 17/30362 707/704 |
| 2010/0198849 A1* | 8/2010 | Thomas | G06F 17/30067 707/758 |
| 2010/0257133 A1* | 10/2010 | Crowe et al. | 706/58 |

\* cited by examiner

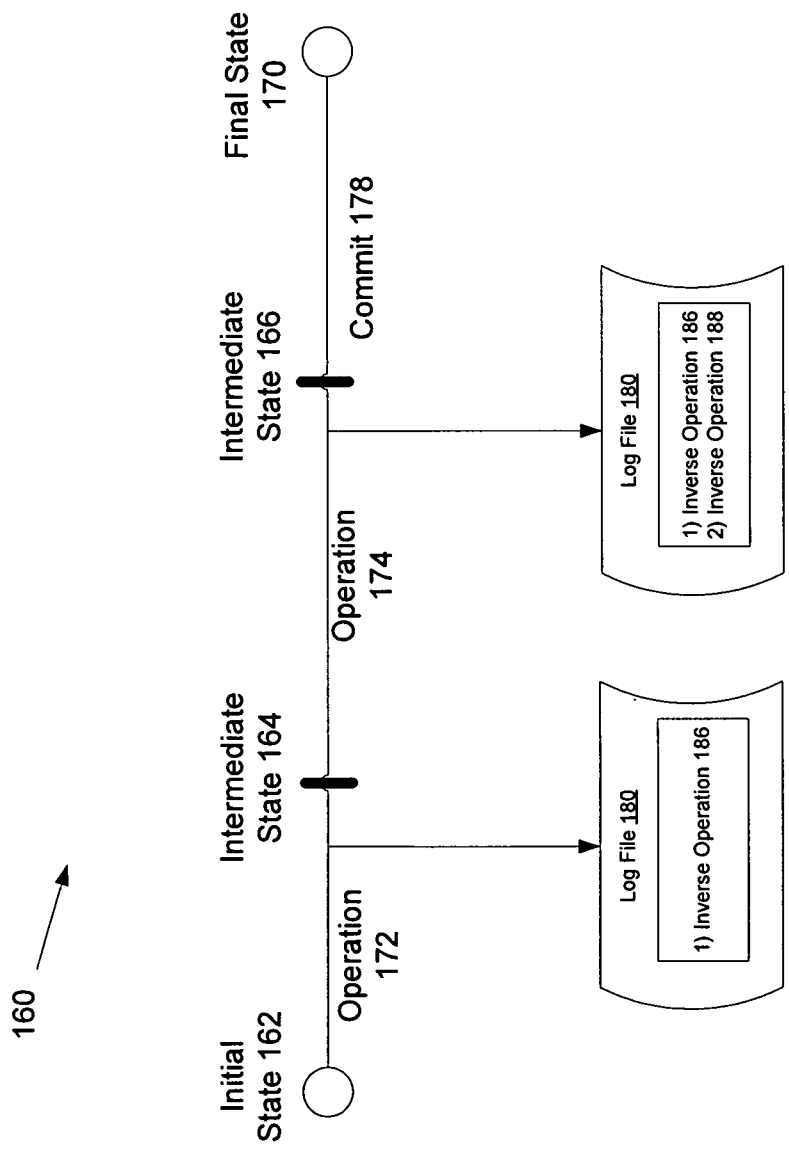

ROLLING BACK STATE CHANGES IN DISTRIBUTED TRANSACTIONS

TECHNICAL FIELD

Embodiments of the present invention relate to distributed transactions, and more specifically to reducing the resources necessary to perform distributed transactions.

BACKGROUND

Distributed transactions are often performed on distributed computing systems. A distributed transaction is a set of operations that update shared resources. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared resources. The Isolation property requires that intermediate effects of the transaction are not detectable to concurrent transactions. Finally, the Durability property requires that changes to shared resources due to the transaction are permanent.

To ensure the Atomicity property, all participants of the distributed transaction must coordinate their actions so that they either unanimously abort or unanimously commit to the transaction. Before making any state changes to a resource or resources for the transaction, each participant generates a copy of the present state of the resource or resources to be changed during the transaction. The state changes are then made to the resource during the transaction. If the transaction aborts, then the resource is rolled back to its initial state that was saved.

When the state of the resource is large (e.g., 10 megabytes (MB)), storing a copy of the state can become a burdensome performance overhead. Even if only a small portion (e.g., a few bytes) of a large resource (e.g., a 10 MB object) are to be modified during the transaction, the entire state of the resource (e.g., the entire 10 MB) still needs to be saved in conventional transactional systems. Embodiments of the present invention can mitigate the overhead associated with rolling back aborted transactions.

BRIEF DESCRIPTION OF THE DRAWINGS

The present invention is illustrated by way of example, and not by way of limitation, in the figures of the accompanying drawings and in which:

FIG. 1B illustrates a diagram of a resource manager's participation in a transaction, in accordance with one embodiment of the present invention;

DETAILED DESCRIPTION

Figure 1A:
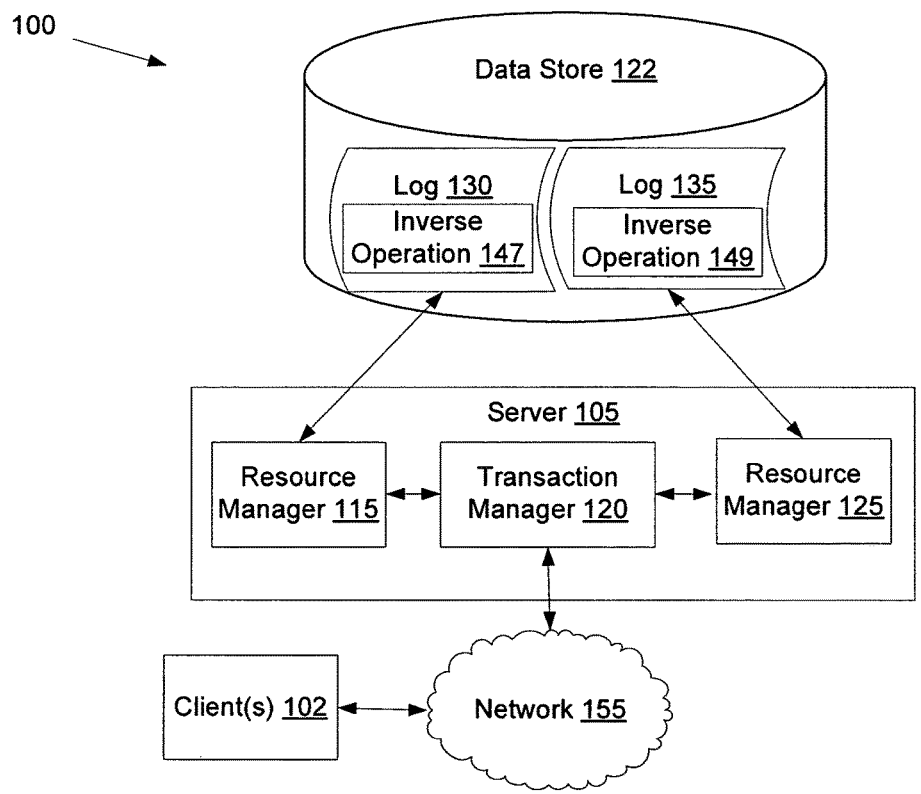
FIG. 1A illustrates an exemplary distributed computing system, in which embodiments of the present invention may operate.

Described herein is a method and apparatus for performing distributed transactions. In one embodiment, during a distributed transaction, a computing device that hosts a participant of the distributed transaction intercepts an operation to change a resource from an initial state to a resultant state. The computing device determines an inverse operation that will change the resource from the resultant state back to the initial state. The computing device records the inverse operation and performs the operation. If additional operations will change the state of the resource during the transaction, the computing device also intercepts those, and determines and stores inverse operations to them before performing the additional operations. If the transaction is aborted, then each of the inverse operations is performed to cause the resource to be reverted back to the initial state.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "intercepting", "recording", "performing", "determining", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

FIG. 1A illustrates an exemplary distributed computing system 100, in which embodiments of the present invention may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services. In one embodiment, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In one embodiment, the distributed computing system 100 includes one or more clients 102 and one or more servers (e.g., server 105) connected via a network 155. The network 155 may be a private network (e.g., local area network (LAN), wide area network (WAN), intranet, etc.), a public network (e.g., the Internet), or a combination thereof.

Client(s) 102 may be, for example, personal computers (PC), palm-sized computing devices, personal digital assistants (PDA), etc. Client(s) 102 may also be applications run on a PC, server, database, etc. In the SOA, client(s) 102 include applications that access services. Client(s) 102 may be fat clients (client that performs local processing and data storage), thins client (client that performs minimal or no local processing and minimal to no data storage), and/or hybrid clients (client that performs local processing but little to no data storage).

Server 105 and/or additional servers (not shown) may host services, applications and/or other functionality that is available to clients 102 on the distributed computing system 100. Server 105 may be a single machine, or may include multiple interconnected machines (e.g., machines configured in a cluster).

In one embodiment, the server 105 includes a transaction manager 120, a resource manager 115 and a resource manager 125. A transaction manager 120 is a software module that coordinates multiple participants during a distributed transaction. A participant may be another transaction manager (e.g., hosted by another server) or a local resource manager (e.g., resource manager 115 and resource manager 125). Coordinating a distributed transaction includes determining whether each participant can commit to a transaction, directing each participant to commit if all are able, and directing each participant to rollback (e.g., revert to an initial state that existed prior to the transaction) if not all participating nodes are able to commit.

In one embodiment, transaction manager 120 acts as a master coordinator node, and coordinates a distributed transaction between resource manager 115, resource manager 125 and/or a transaction manager of another server (not shown). A master coordinator node is a transaction manager that acts on behalf of a process that initiates a distributed transaction (e.g., by initiating a commit operation) to coordinate all participants of the distributed transaction. A master coordinator node must arrive at a commit or abort decision and propagate that decision to all participants. In one embodiment, transaction manager 120 is configured to initiate a two-phase commit distributed transaction if there are multiple resource managers and/or transaction managers that will participate in the transaction.

In another embodiment, transaction manager 120 may act as an intermediate coordinator node (e.g., for a transaction initiated on another server), and coordinate a distributed transaction between only resource manager 115 and resource manager 125. An intermediate coordinator node is a transaction manager that acts on behalf of a process that participates in a distributed transaction to coordinate local resource managers and/or additional transaction managers that are participants in the distributed transaction. An intermediate coordinator node gathers information about the participants that it manages, and reports the information to a master coordinator node. An intermediate coordinator node also receives commit or abort decisions from a master coordinator node, and propagates the decisions to participants that it manages.

A resource manager (e.g., resource manager 115 and resource manager 125) is a software module that manages a resource. A resource represents a physical and tangible object, such as an object stored in a memory. A resource may be a persistent and stable storage system such as a database and file manager. Server 105 may include one or more applications and/or services that can participate in distributed transactions. Each such application/service can also be considered a resource, and can be managed by a resource manager 115, 125. For example, a calendar scheduling program that operates on server 105 may be managed by resource manager 115, and a banking application that operates on server 105 may be managed by an resource manager 125.

In one embodiment, resource manager 115 and resource manager 125 each manage a single resource. Alternatively, resource managers may be configured to manage multiple resources (e.g., resource manager 115 may manage both the banking application and the calendar scheduling application).

In one embodiment, a distinct resource manager is integrated with (e.g., a module or plugin for) each of one or more applications and/or services to provide distributed computing capabilities. In another embodiment, a resource manager and transaction manager may be combined into a single logic component. For example, resource manager 115 may be combined with transaction manager 120. Accordingly, resource manager 115 may act as both a resource manager and a transaction manager (e.g., may coordinate transactions and/or participate in transactions). In a further embodiment, the combined resource/transaction manager may be further combined with the resource (e.g., application, service or process) that it manages. For example, a calendar scheduling application that operates on server 105 may include an integrated resource manager and transaction manager.

In one embodiment, server 105 is coupled with a data store 122. Data store 122 may include a file system, a database, or other data storage arrangement. In one embodiment, data store 122 is internal to server 105. Alternatively, data store 122 may be external to server 105, and connected with server 105 either directly or via a network.

In one embodiment, each of the resource manager 115 and the resource manager 125 maintains a log (e.g., log 130 and log 135) on data store 122. The log may be an undo log (log of committed changes that occur during a distributed transaction) and/or a redo log (log of uncommitted changes that occur during a distributed transaction). The redo log and/or undo log can be used to roll back any changes that occurred during a distributed transaction if the transaction is aborted.

In one embodiment, the logs 130, 135 (e.g., log files) include indicators specifying when the transaction started, a transaction identifier uniquely identifying the transaction, and a name of the data resource that is being updated. In one embodiment, the logs 130, 135 also include a copy of the resultant state of the resource, to enable the resultant state or the initial state to be reconstructed in the occurrence of a system failure. In one embodiment, the logs 130, 135 also include commit indicators that identify whether the resource manager managing the resource had committed to the associated transaction or aborted the transaction.

In conventional transaction systems, undo logs and redo logs both include a copy of the initial state of resources that have been modified during a transaction. In one embodiment of the present invention, undo logs and redo logs do not into include a copy of the initial state of the resources. Instead, the logs include a record of inverse operations that, if performed, will cause a present state of the resources to revert back to the initial state of the resources before the transaction was initiated. Such logs can consume considerably less memory resources than logs that include copies of the initial states. For example, if only a few bytes of a 10 MB object were changed during a transaction (e.g., via an increment operation), then storing a copy of the initial state would require 10 MB. On the other hand, storing a decrement operation would consume only a fraction of that. As illustrated, log 130 includes inverse operation 147 and log 135 includes inverse operation 149.

Each resource manager 115, 125 that participates in a distributed transaction may be a participant node of the transaction. During a prepare phase of a two-phase commit distributed transaction, a participant node is asked whether it can commit to the transaction by a coordinator node (e.g., an intermediate coordinator node or a master coordinator node). If the resource manager 115, 125 can commit to the transaction, it sends a commit response to the coordinator node. If the resource manager 115, 125 cannot commit to the transaction, it sends an abort message to the coordinator node. Alternatively, if the resource manager 115, 125 will not undergo a state change from the distributed transaction, it can send a read-only response to the coordinator node. The resource manager 115, 125 is then dropped out of the transaction, and will not later be directed to commit or abort during a commit phase.

During a commit phase of a two-phase commit distributed transaction, each resource manager 115, 125 receives a commit command if all resource managers indicated that they were able to commit. If one or more of the participating resource managers sent an abort response, then all resource managers receive an abort command during the commit phase. Upon receiving the abort command, each of the resource managers rolls back the transaction so that any resources modified by the transaction will revert to initial states that they had prior to the transaction. In one embodiment, the resource managers 115, 125 roll back the operations by performing one or more inverse operations included in a log or logs (e.g., inverse operation 147 in log 130). Once the transaction has been successfully aborted, and the resources are in their initial state, the logs 130, 135 can be deleted.

FIG. 1B illustrates a diagram of a resource manager's participation in a transaction 160, in accordance with one embodiment of the present invention. The resource manager may correspond to a resource manager of FIG. 1A (e.g., resource manager 115 or 125). When the transaction begins, a resource managed by the resource manager has an initial state 162 (e.g., an object of a service, application, process, etc. has an initial state). During the transaction, an operation 172 is performed on the resource. Before the resource manager performs or permits the operation 172, the resource manager determines an inverse operation 186 of the operation 172, and stores the inverse operation 186 in a log file 180. For example, if there is an increment operation that is used to update a small portion of the state of an object included in the resource, for example, then the resource manager can determine an appropriate decrement operation that is an inverse to the increment operation.

In one embodiment, the operation is explicitly associated with the inverse by the resource itself. For example, when a service was programmed, one or more operations (e.g., methods) included in the service may have been explicitly associated with inverse operations by the programmer. Thus, the resource may automatically identify the inverse operations. In another embodiment, the resource manager can infer the inverse operation by trapping the operation and examining how the operation is going to modify the resource. For example, the resource manager may automatically work out that the inverse of plus one is minus one. The resource manager in one embodiment includes a list of operations and their inverses (e.g., identifying that the opposite to increment is decrement, the opposite to multiply is divide, etc.). Therefore, the resource manager can trap all state modifications within the scope of a transaction on a per object or per resource basis, and record the inverse of those operations.

In one embodiment, for the resource manager to intercept operations, the resource and/or resource manager need to have been written in a programming language that permits high level access to operations that have been and/or will be performed on the resources. For example, the Java language allows a process to intercept all operations and all state variable accesses on all classes that are running. Using Java, the resource manager can intercept operations to see what state changes are about to happen to a resource (e.g., about to add 1, or multiply by 5). The resource manager can then infer the compensations that will undo the state changes.

The resource manager then performs the operation, which causes the resource to have intermediate state 164.

After performing operation 172, the resource manager determines that another operation 174 is to be performed for the transaction. For example, the resource manager 172 may intercept an instruction to perform the operation. The resource manager determines an inverse operation 188 of the operation 174, and records the inverse operation 188 in the log file 180. The resource manager then performs the operation (or causes the operation to be performed by an application or process). After the operation 174 is performed, the resource has intermediate state 166.

The resource manager receives a command to commit 178 the transaction, and saves intermediate state 166 to permanent storage as a final state 170 of the resource. If the resource manager had instead received an abort command, it would use the log file to apply inverse operation 188 to intermediate state 166. This would cause the resource to revert to intermediate state 164. Resource manager would then perform inverse operation 186 to intermediate state 164 to revert the resource back to initial state 162.

Figure 2A:
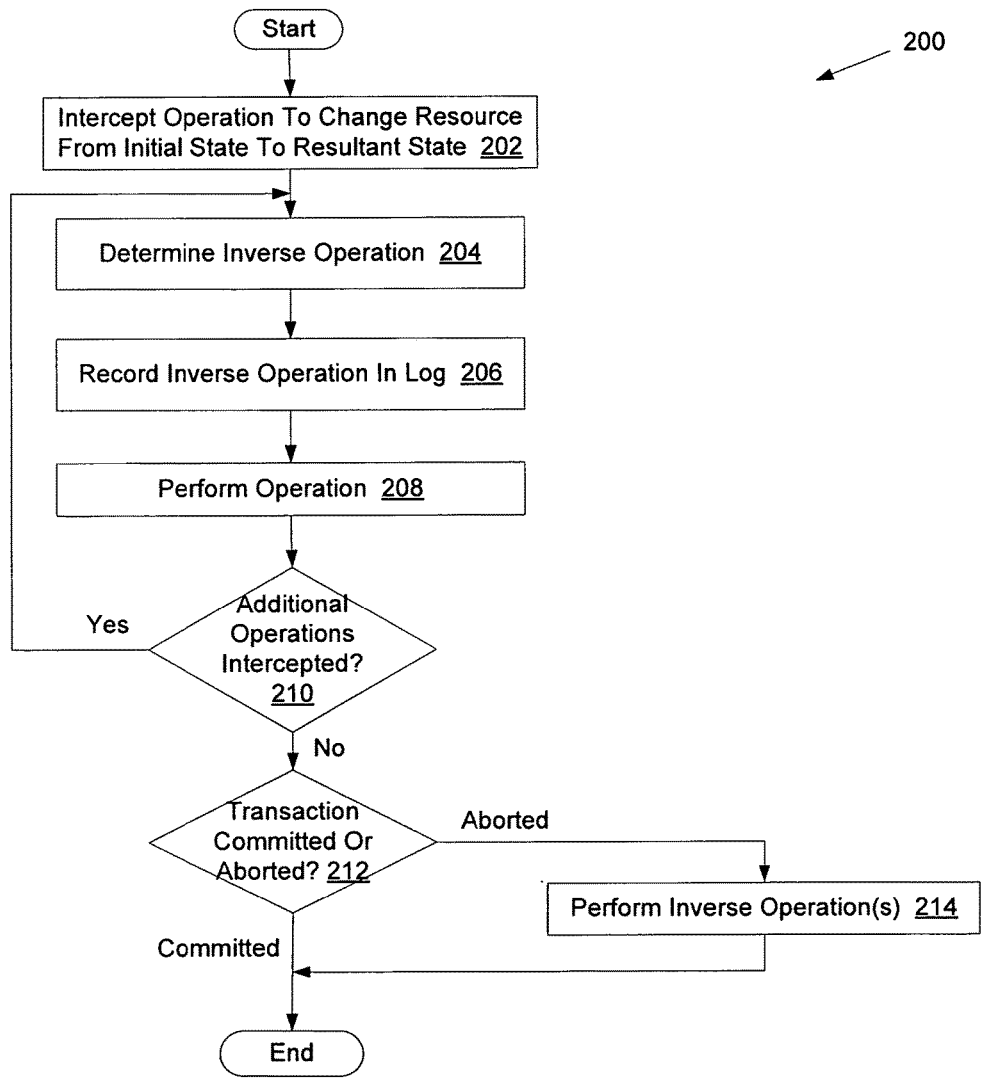
FIG. 2A illustrates a flow diagram of one embodiment for a method of optimizing the use of resources for a distributed transaction.

FIG. 2A illustrates a flow diagram of one embodiment for a method 200 of optimizing the use of resources for a distributed transaction. The method is performed by processing logic that comprises hardware (e.g., circuitry, dedicated logic, programmable logic, microcode, etc.), software (such as instructions run on a processing device), or a combination thereof. In one embodiment, method 200 is performed by a resource manager 115, 125 of FIG. 1A.

Referring to FIG. 2A, at block 202 of method 200 a resource manager intercepts an operation to change a resource (e.g., an object) from an initial state to a resultant state. At block 204, the resource manager determines an inverse operation that would cause the resource to change from the resultant state back to the initial state.

At block 206, the resource manager records the inverse operation in a log. At block 208, the resource manager performs the operation.

At block 210, the resource manager determines whether any additional operations are to be performed (e.g., intercepts any additional operations). If there are additional operations to be performed, the method returns to block 204. If there are no more operations to be performed, the method continues to block 212.

At block 212, the resource manager determines whether the transaction is to be committed or aborted. If an abort command is received, the method proceeds to block 214. If a commit command is received, the method ends.

At block 214, the resource manager performs each of the inverse operations in reverse order to the order in which they were created. After performing the inverse operations, the resource is reverted to its initial state. The method then ends.

Figure 2B:
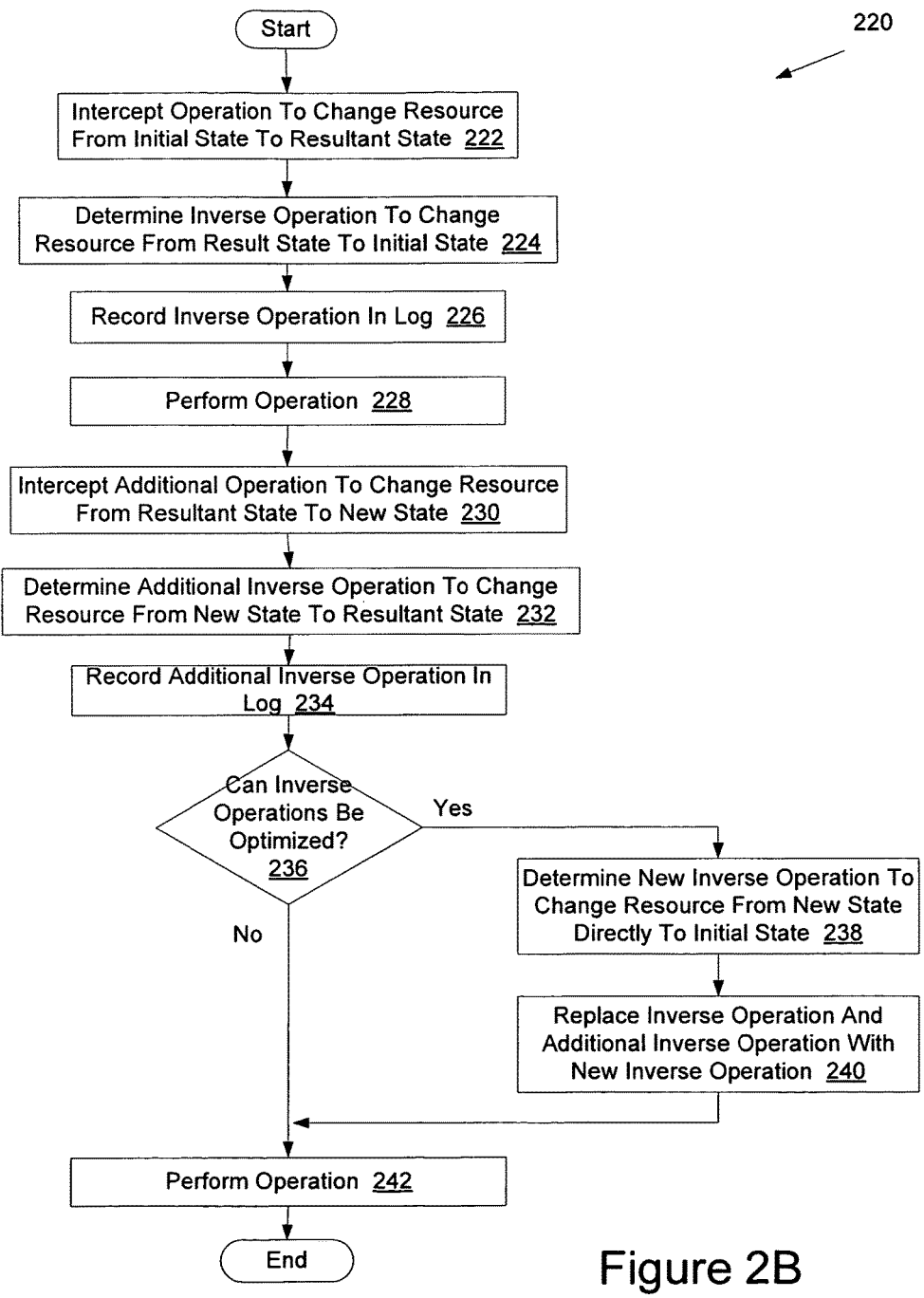
FIG. 2B illustrates a flow diagram of another embodiment for a method of optimizing the use of resources for a distributed transaction.

FIG. 2B illustrates a flow diagram of another embodiment for a method 220 of optimizing the use of resources for a distributed transaction. The method is performed by processing logic that comprises hardware (e.g., circuitry, dedicated logic, programmable logic, microcode, etc.), software (such as instructions run on a processing device), or a combination thereof. In one embodiment, method 220 is performed by a resource manager 115, 125 of FIG. 1A.

Referring to FIG. 2B, at block 222 of method 220 a resource manager intercepts an operation to change a resource (e.g., an object of a service) from an initial state to a resultant state. At block 224, the resource manager determines an inverse operation that would cause the resource to change from the resultant state back to the initial state. At block 226, the resource manager records the inverse operation in a log. At block 228, the resource manager performs the operation.

At block 230, the resource manager intercepts an additional operation to change the resource from the resultant state to a new state. At block 232, the resource manager determines an additional inverse operation that would cause the resource to change from the new state to the resultant state. At block 234, the resource manager records the inverse operation in a log.

At block 236, the resource manager determines whether the inverse operations can be optimized. The inverse operations can be optimized if they can be combined into a single inverse operation. In other words, is there a single inverse operation that can cause the new state to revert directly to the initial state without first reverting to the resultant state? If the inverse operations can be optimized the method proceeds to block 238. Otherwise, the method continues to block 242.

For example, if an increment by one operation was called twenty times in the scope of a single transaction, twenty different decrement by one operations would be recorded in a log. These twenty decrement by one operations by be optimized by combining them into a single decrement by twenty operation.

At block 238, the resource manager determines a new inverse operation that will cause the resource to change directly from the new state to the initial state. At block 240, the resource manager replaces the inverse operation and the additional inverse operation with the new inverse operation. The method then continues to block 242.

At block 242, the resource manager performs the operation.

In one embodiment, the additional inverse operation is not stored in the log if the inverse operations can be optimized at block 236. In such an embodiment, block 234 is performed after block 236 if the inverse operations cannot be optimized.

Figure 2C:
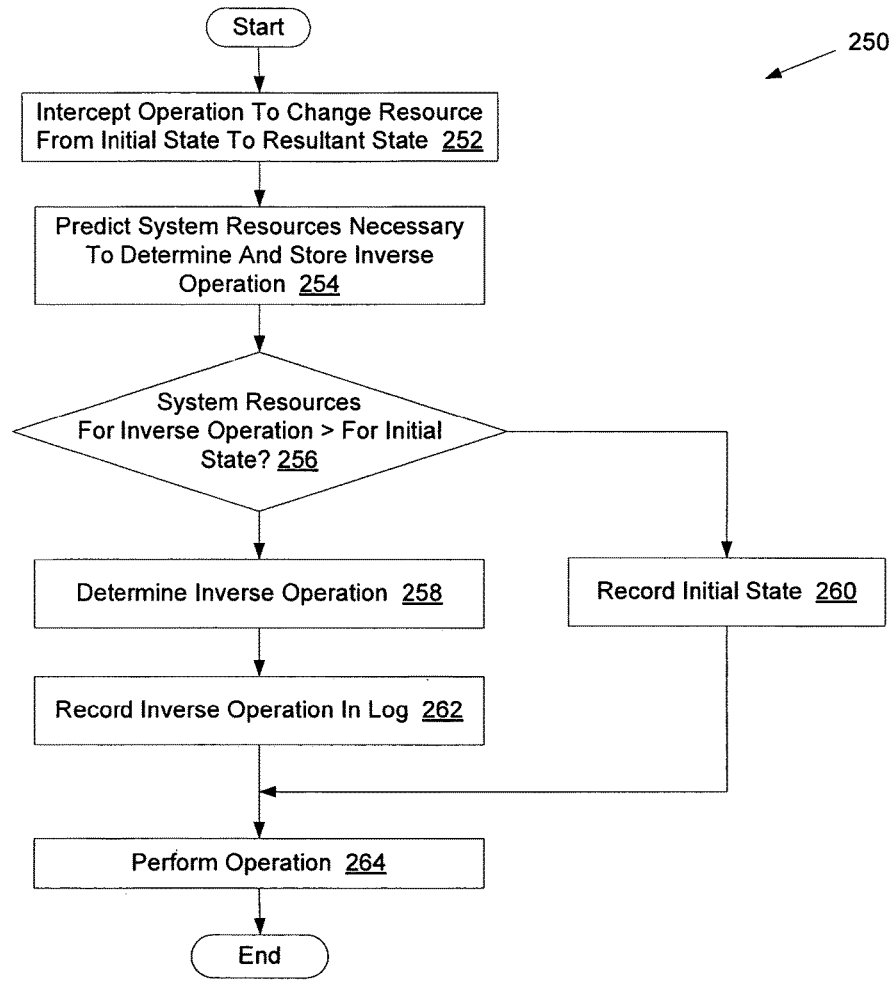
FIG. 2C illustrates a flow diagram of yet another embodiment for a method of optimizing the use of resources for a distributed transaction.

FIG. 2C illustrates a flow diagram of yet another embodiment for a method 250 of optimizing the use of resources for a distributed transaction. The method is performed by processing logic that comprises hardware (e.g., circuitry, dedicated logic, programmable logic, microcode, etc.), software (such as instructions run on a processing device), or a combination thereof. In one embodiment, method 250 is performed by a resource manager 115, 125 of FIG. 1A.

Referring to FIG. 2C, at block 252 of method 250 a resource manager intercepts an operation to change a resource (e.g., an object) from an initial state to a resultant state. At block 254, the resource manager predicts an amount of system resources that will be needed to determine and store an inverse operation to the operation. At block 256, the resource manager compares the amount of system resources necessary to determine and store the inverse operation to the amount of resources necessary to store the initial state. If the amount of resources necessary to compute and store the inverse operation exceed those needed to store the initial state, the method proceeds to block 260, and the initial state is recorded in a log. If the amount of resources necessary to compute and store the inverse operation is less than the amount of resources that are necessary to store the initial state, the method proceeds to block 258.

Typically, storing the inverse operation takes significantly less memory than storing the initial state. However, additional computation is needed to determine the inverse operation. Therefore, whether to store the initial state or the inverse operation in some instances may be determined based on the current distribution of system resources available to the resource manager. For example, if the resource manager has an abundance of memory, but little available processing power, then the initial state may be stored. Alternatively, if the resource manager has limited memory but plenty of available processing power, then the inverse operation may be determined and stored.

At block 258, the resource manager determines the inverse operation that would cause the resource to change from the resultant state back to the initial state. At block 262, the resource manager records the inverse operation in a log.

At block 264, the resource manager performs the operation. The method then ends.

Figure 3:
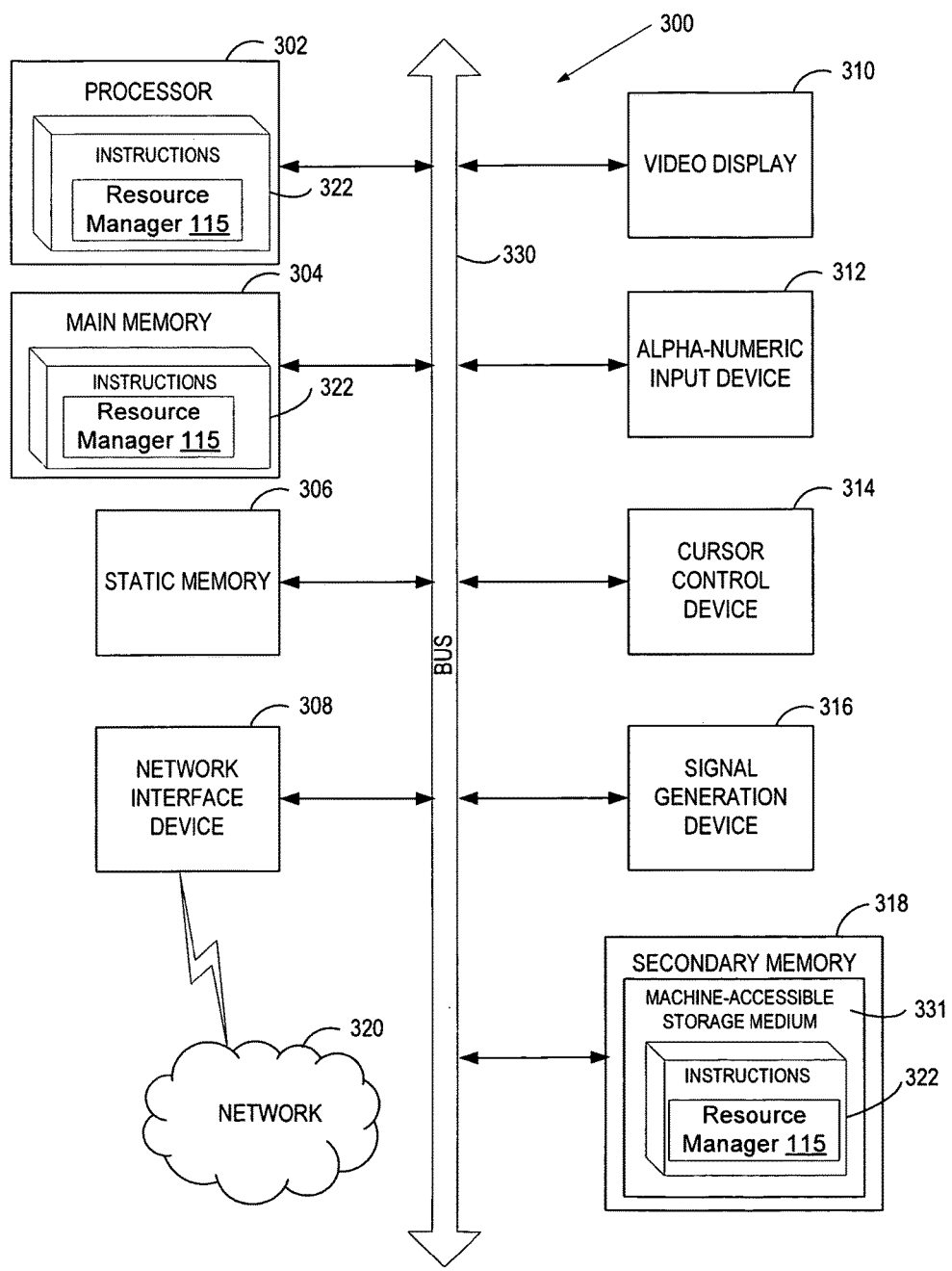
FIG. 3 illustrates a block diagram of an exemplary computer system, in accordance with one embodiment of the present invention.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 318 (e.g., a data storage device), which communicate with each other via a bus 330.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute instructions 322 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The secondary memory 318 may include a machine-readable storage medium (or more specifically a computer-readable storage medium) 331 on which is stored one or more sets of instructions 322 embodying any one or more of the methodologies or functions described herein. The instructions 322 may also reside, completely or at least partially, within the main memory 304 and/or within the processing device 302 during execution thereof by the computer system 300, the main memory 304 and the processing device 302 also constituting machine-readable storage media. The software 322 may further be transmitted or received over a network 320 via the network interface device 308.

The machine-readable storage medium 331 may also be used to store a resource manager (e.g., resource managers 115, 125 of FIG. 1A), and/or a software library containing methods that call resource managers. While the machine-readable storage medium 331 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying, by a processing device of a computing device participating in a distributed transaction with other computing devices, a first operation to change a resource associated with the distributed transaction from an initial state to an intermediate state, a second operation to change the resource from the intermediate state to a resultant state, and an additional operation to change the resource from the resultant state to a new state;
   performing the first operation, second operation, and the additional operation to change the resource from the initial state to the new state;
   determining that an amount of resources to determine a plurality of inverse operations to return the resource from the new state to the initial state after a performance of the first operation, the second operation, and the additional operation does not exceed an amount of resources to store the initial state of the resource;
   in response to determining that the amount of resources to determine the plurality of inverse operations does not exceed the amount of resources to store the initial state of the resource, determine, by the processing device, the plurality of inverse operations that, when applied to the resource, changes the resource from the new state to the initial state, the plurality of inverse operations comprising a first inverse operation to change the resource from the intermediate state to the initial state, a second inverse operation to change the resource from the resultant state to the intermediate state, and an additional inverse operation to change the resource from the new state to the resultant state;

optimizing the plurality of inverse operations to generate a new inverse operation to replace the first inverse operation, the second inverse operation, and the additional inverse operation by combining the first inverse operation, the second inverse operation, and the additional inverse operation to change the resource from the new state directly to the initial state; and performing the new inverse operation on the resource after the performing of the first operation, the second operation, and the additional operation.

2. The method of claim 1, wherein the performing of the new inverse operation is in response to receiving a command to abort the distributed transaction.

3. The method of claim 1, further comprising:
receiving a command to abort the distributed transaction; and
performing the additional inverse operation before performing the first and second inverse operations.

4. The method of claim 1, wherein the first operation is a multiplication operation and the first inverse operation is a division operation.

5. A non-transitory computer-readable storage medium having stored therein instructions that, when executed by a processing device of a computing device, cause the processing device to:
identify, by the processing device of the computing device participating in a distributed transaction with other computing devices, a first operation to change a resource associated with the distributed transaction from an initial state to an intermediate state, a second operation to change the resource from the intermediate state to a resultant state, and an additional operation to change the resource from the resultant state to a new state;
perform the first operation, second operation, and the additional operation to change the resource from the initial state to the new state
determine that an amount of resources to determine a plurality of inverse operations to return the resource from the new state to the initial state after a performance of the first operation, the second operation, and the additional operation does not exceed an amount of resources to store the initial state of the resource;
in response to determining that the amount of resources to determine the plurality of inverse operations does not exceed the amount of resources to store the initial state of the resource, determine, by the processing device, the plurality of inverse operations that, when applied to the resource, changes the resource from the new state to the initial state, the plurality of inverse operations comprising a first inverse operation to change the resource from the intermediate state to the initial state, a second inverse operation to change the resource from the resultant state to the intermediate state, and an additional inverse operation to change the resource from the new state to the resultant state;
optimize the plurality of inverse operations to generate a new inverse operation to replace the first inverse operation, the second inverse operation, and the additional inverse operation by combining the first inverse operation, the second inverse operation, and the additional inverse operation to change the resource from the new state directly to the initial state; and
perform the new inverse operation on the resource after the performing of the first operation, the second operation, and the additional operation.

6. The non-transitory computer-readable storage medium of claim 5, wherein to perform the new inverse operation, the processing device is to perform the new inverse operation in response to receiving a command to abort the distributed transaction.

7. The non-transitory computer-readable storage medium of claim 5, the processing device further to:
receive a command to abort the distributed transaction; and
perform the additional inverse operation before performing the first and second inverse operations.

8. A system comprising:
a memory storing a plurality of inverse operations; and
a processing device, operatively coupled with the memory, configured to:
identify a first operation to change a resource associated with a distributed transaction from an initial state to an intermediate state, a second operation to change the resource from the intermediate state to a resultant state, and an additional operation to change the resource from the resultant state to a new state;
perform the first operation, second operation, and the additional operation to change the resource from the initial state to the new state;
determine that an amount of resources to determine the plurality of inverse operations to return the resource from the new state to the initial state after a performance of the first operation, the second operation, and the additional operation does not exceed an amount of resources to store the initial state of the resource;
in response to determining that the amount of resources to determine the plurality of inverse operations does not exceed the amount of resources to store the initial state of the resource, determine the plurality of inverse operations that, when applied to the resource by the processing device, changes the resource from the new state to the initial state, the plurality of inverse operations comprising a first inverse operation to change the resource from the intermediate state to the initial state, a second inverse operation to change the resource from the resultant state to the intermediate state, and an additional inverse operation to change the resource from the new state to the resultant state;
optimize the plurality of inverse operations to generate a new inverse operation to replace the first inverse operation, the second inverse operation, and the additional inverse operation by combining the first inverse operation, the second inverse operation, and the additional inverse operation to change the resource from the new state directly to the initial state; and
perform the new inverse operation on the resource after the performing of the first operation, the second operation, and the additional operation.

9. The system of claim 8, wherein to perform the new inverse operation, the processing device is to perform the new inverse operation in response to receiving a command to abort the distributed transaction.

10. The system of claim 8, the processing device is further to:
receive a command to abort the distributed transaction; and
perform the additional inverse operation before performing the first and second inverse operations.

11. The system of claim 8, wherein the first operation is an increment operation and the first inverse operation is a decrement operation.

\* \* \* \* \*